United States Patent
Tsuchiya

(10) Patent No.: US 8,133,008 B2
(45) Date of Patent: Mar. 13, 2012

(54) AXIAL FLOW FLUID APPARATUS AND BLADE

(75) Inventor: Naoki Tsuchiya, Tokyo (JP)

(73) Assignee: IHI Corporation (JP)

( * ) Notice: Subject to any disclaimer, the term of this patent is extended or adjusted under 35 U.S.C. 154(b) by 576 days.

(21) Appl. No.: 12/296,191

(22) PCT Filed: Mar. 5, 2007

(86) PCT No.: PCT/JP2007/054231
§ 371 (c)(1),
(2), (4) Date: Apr. 10, 2009

(87) PCT Pub. No.: WO2007/116621
PCT Pub. Date: Oct. 18, 2007

(65) Prior Publication Data
US 2009/0220332 A1    Sep. 3, 2009

(30) Foreign Application Priority Data

Apr. 7, 2006  (JP) ................ P2006-106158

(51) Int. Cl.
*F01D 5/14* (2006.01)
*F04D 29/38* (2006.01)
*F04D 29/66* (2006.01)

(52) U.S. Cl. ......... 415/115; 415/119; 416/232; 416/500

(58) Field of Classification Search ........... 416/232, 416/500; 415/115, 119
See application file for complete search history.

(56) References Cited

U.S. PATENT DOCUMENTS

| | | |
|---|---|---|
| 3,298,636 A | 1/1967 | Arnholdt |
| 6,004,095 A | 12/1999 | Waitz et al. |
| 2001/0036401 A1* | 11/2001 | Harvey et al. ......... 415/115 |

FOREIGN PATENT DOCUMENTS

| | | |
|---|---|---|
| JP | 55-64497 | 5/1980 |
| JP | 07-243397 | 9/1995 |
| JP | 9-79187 | 3/1997 |
| JP | 2003-161104 | 6/2003 |
| JP | 2003-227302 | 8/2003 |
| JP | 2005-240749 | 9/2005 |

OTHER PUBLICATIONS

Christopher Halasz, et al., Fan Flow Control for Noise Reduction Part 1: Advanced Trailing Edge Blowing Concepts: AIAA 2005-3025, pp. 1-13.
Matthew D. Landford, et al., Fan Flow Control for Noise Reduction Part 2: Investigation of Wake-Filling Techniques: AIAA 2005-3026, pp. 1-15.

(Continued)

*Primary Examiner* — Asok Sarkar
(74) *Attorney, Agent, or Firm* — Ostrolenk Faber LLP

(57) ABSTRACT

An axial flow fluid apparatus axially provided with a plurality of blade rows having a plurality of blades arranged around a shaft is provided. A fluid passage for jetting a fluid to a downstream velocity defect region resulting from a blade is formed in at least one of blades constituting a blade row installed on the upstream side of the plurality of blade rows so as to lead from a positive pressure surface to a negative pressure surface or a trailing edge.

8 Claims, 6 Drawing Sheets

OTHER PUBLICATIONS

Matthew D. Langford, et al., Fan Flow Control for Noise Reduction Part 3: Rig Testing of Optimal Design: AIAA 2005-3027, pp. 1-14.

Daniel L. Sutliff, Low-Speed Fan Noise Reduction with Trailing Edge Blowing: AIAA 2002-2492, pp. 1-35.

Japanese Decision of Rejection, dated Apr. 26, 2011, issued in corresponding Japanese Application No. 2006-106158, with English translation. Total 3 pages.

International Search Report dated May 15, 2007, issued in corresponding international application No. PCT/JP2007/054231.

* cited by examiner

AXIAL FLOW FLUID APPARATUS AND BLADE

CROSS REFERENCE TO RELATED APPLICATIONS

The present application is a 35 U.S.C. §371 National Phase conversion of PCT/JP2007/054231, filed Mar. 5, 2007, which claims benefit of Japanese Application No. 2006-106158, filed Apr. 7, 2006, the disclosure of which is incorporated herein by reference. The PCT International Application was published in the Japanese language.

BACKGROUND OF THE INVENTION

1. Field of the Invention

The present invention relates to an axial flow fluid apparatus in which fluid flows axially, and blades are exposed into the fluid.

2. Description of Related Art

Among axial flow fluid apparatuses in which fluid flows axially, there is one in which a moving blade row and a stationary blade row are axially arranged. For example, a jet engine, a compressor, and a turbine can be mentioned.

The moving blade row includes a plurality of moving blades, and the stationary blade row includes a plurality of stationary blades. Also, in such an axial flow fluid apparatus, it is known that, as the moving blade row rotates, a velocity defect region where a stream of air is slow in comparison to surrounding regions is created on the downstream of the moving blades. The stream in this velocity defect region is generally called wake. The width of the stream becomes narrow, and the velocity defect becomes strong, and the velocity defect becomes strong just behind of the moving blades. Where the width of the stream becomes wide, the velocity defect becomes weak further away from the moving blades.

In an axial flow fluid apparatus in which a stationary blade row is installed on the downstream of the moving blade row, noise or vibration is generated as a wake resulting from the moving blades interferes with the stationary blade. It is known that this noise or vibration becomes large when the wake is strong, i.e. the velocity defect is large, and becomes small when the wake is weak i.e., the velocity defect is small.

Thus, for example, an invention which reduces the noise or vibration by widening the spacing between the moving blade row and the stationary blade row, utilizing the fact that the wake becomes weaker when further away from the moving blades, is disclosed in Patent Document 1 (Japanese Unexamined Patent Application Publication No. 2003-227302).

Further, an invention and techniques in which the wake is weakened, and the noise or vibration is reduced by jetting the air introduced to the velocity defect region from the outside are described in Patent Document 2 (U.S. Pat. No. 6,004,095) and the following Non-Patent Documents 1 to 4.

Non-Patent Document 1:
'Fan Flow Control for Noise Reduction Part 1: Advanced Trailing Edge Blowing Concepts': AIAA (American Institute of Aeronautics and Astronautics) 2005-3025: Christopher Halasz etc.

Non-Patent Document 2:
'Fan Flow Control for Noise Reduction Part 2: Investigation of Wake-Filling Techniques': AIAA (American Institute of Aeronautics and Astronautics) 2005-3026: Matthew D. Langford etc.

Non-Patent Document 3:
'Fan Flow Control for Noise Reduction Part 3: Rig Testing of Optimal Design': AIAA (American Institute of Aeronautics and Astronautics) 2005-3027: Matthew D. Langford etc.

Non-Patent Document 4:
'Low-Speed Fan Noise Reduction with Trailing Edge Blowing': AIAA (American Institute of Aeronautics and Astronautics) 2002-2492: Daniel L. Sutliff However, like Patent Document 1, when the spacing between the moving blade row and the stationary blade row is widened, the axial length of the axial flow fluid apparatus becomes long, and a casing or the like corresponding to the axial length is required. Therefore, the weight of the apparatus may increase or the apparatus may be enlarged. Further, if an increase in weight or enlargement of the apparatus is not allowed, the invention described in Patent Document 1 cannot be used.

Meanwhile, according to the invention described in Patent Document 2, and the techniques described in Non-Patent Documents 1 to 4, it is necessary to separately install a mechanism for introducing external air into the apparatus, and the mechanism may be complicated.

SUMMARY OF THE INVENTION

The present invention has been made in view of the above problems, and aims to reliably reduce noise or vibration without complicating a mechanism.

In order to achieve the above object, the axial flow fluid apparatus of the present invention is an axial flow fluid apparatus axially provided with a plurality of blade rows having a plurality of blades arranged around a shaft. A fluid passage for jetting a fluid to a downstream velocity defect region resulting from the blade is formed in at least one of the blades constituting a blade row installed on the upstream side of the plurality of blade rows so as to lead from a positive pressure surface to a negative pressure surface or a trailing edge.

According to the present invention having such a feature, part of the fluid which flows to the downstream via an upstream blade row is jetted to the velocity defect region via the fluid passage. In the present invention, the fluid is introduced into the fluid passage by utilizing the differential pressure between the pressure on the side of the positive pressure surface and the pressure on the side of the negative pressure surface, and this introduced fluid is jetted to the velocity defect region.

Further, in the axial flow fluid apparatus of the present invention, a construction in which the fluid passage includes a fluid introducing port formed so as to be exposed to the positive pressure surface of the blade, a fluid jet port formed in the negative pressure surface or the trailing edge of the blade, and a passage portion connecting the fluid introducing port and the fluid jet port can be adopted.

Further, in the axial flow fluid apparatus of the present invention, a construction in which, if the blade is hollow, the fluid passage includes a fluid introducing port formed so as to be exposed to the positive pressure surface of the blade, a fluid jet port formed so as to be exposed to the negative pressure surface or the trailing edge of the blade, and the inside of the blade can be adopted.

Further, in the axial flow fluid apparatus of the present invention, a construction in which the fluid introducing port is formed relatively closer to the leading edge of the blade, and the fluid jet port is formed relatively closer to the trailing edge of the blade can be adopted.

Next, the blade of the present invention is a blade exposed into a fluid. A fluid passage for jetting a fluid to a downstream velocity defect region resulting from the blade is formed so as to lead from a positive pressure surface to a negative pressure surface or a trailing edge.

According to the present invention having such a feature, part of the fluid which flows from the upstream of the blade to the downstream thereof is jetted to the velocity defect region via the fluid passage. In the present invention, the fluid is introduced into the fluid passage by utilizing the differential pressure between the pressure on the side of the positive pressure surface and the pressure on the side of the negative pressure surface, and this introduced fluid is jetted to the velocity defect region.

Further, in the blade of the present invention, a construction in which the fluid passage includes a fluid introducing port formed so as to be exposed to the positive pressure surface, a fluid jet port formed in the negative pressure surface or trailing edge, and a passage portion connecting the fluid introducing port and the fluid jet port can be adopted.

Further, in the blade of the present invention, a construction in which, if the inside of the blade is hollow, the fluid passage includes a fluid introducing port formed so as to be exposed to the positive pressure surface, to a fluid jet port formed so as to be exposed to the negative pressure surface or the trailing edge, and the inside can be adopted.

Further, in the blade of the invention, a construction in which the fluid introducing port is formed relatively closer to the leading edge of the blade, and the fluid jet port is formed relatively closer to the trailing edge of the blade can be adopted.

According to the invention, part of the fluid which flows from the upstream of the blade to the downstream thereof is jetted to the velocity defect region via the fluid passage. For this reason, it is possible to weaken the wake and to reduce the noise or vibration.

Further, the fluid is introduced into the fluid passage by utilizing the differential pressure between the pressure on the side of the positive pressure surface and the pressure on the side of the negative pressure surface, and this introduced fluid is jetted to the velocity defect region. Therefore, it is not necessary to introduce outside air into the inside of the apparatus, and it is possible to jet a fluid to the velocity defect region by a simple mechanism.

According to the present invention, it is possible to reliably reduce noise or vibration without complicating the mechanism.

DETAILED DESCRIPTION OF THE INVENTION

Figure 1:
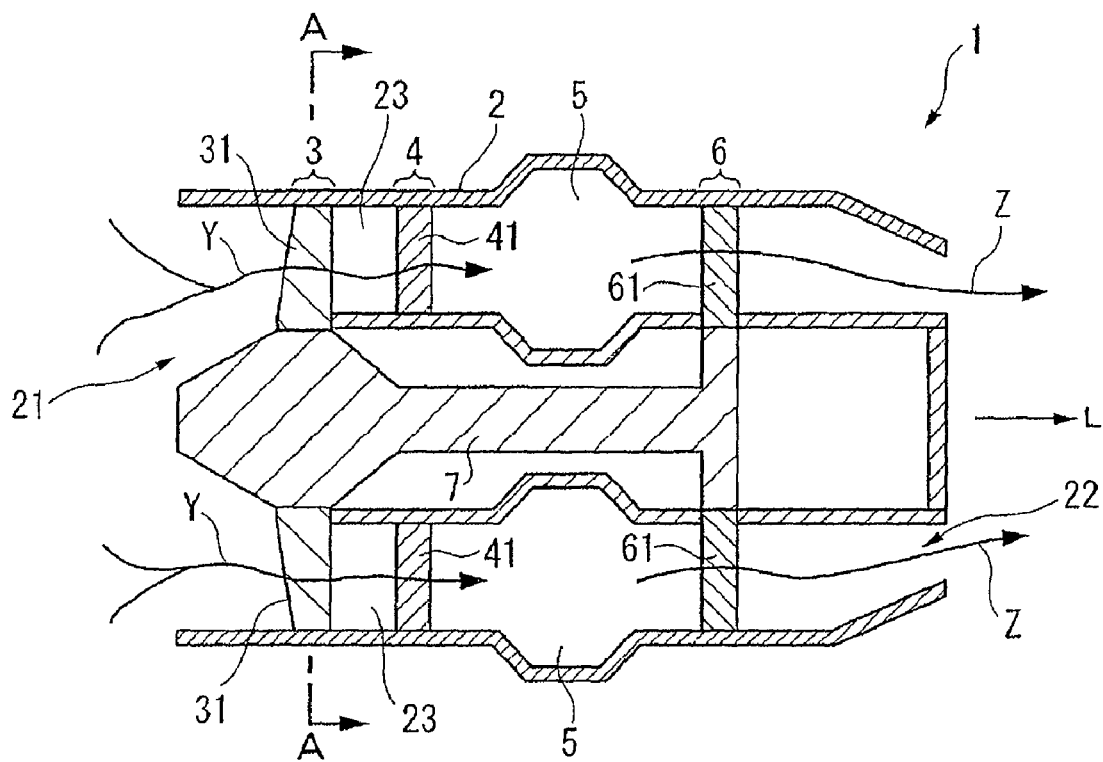
FIG. 1 is a sectional view showing the schematic configuration of a jet engine in a first embodiment of the present invention.

Hereinafter, one embodiment of the axial flow fluid apparatus according to the present invention will be described with reference to the drawings. In addition, in the following embodiment, a jet engine will be described as an example of the axial flow fluid apparatus of the present invention. Further, in the drawings, the scale of individual members is appropriately changed such that each member has a recognizable size.

First Embodiment

Figure 2:
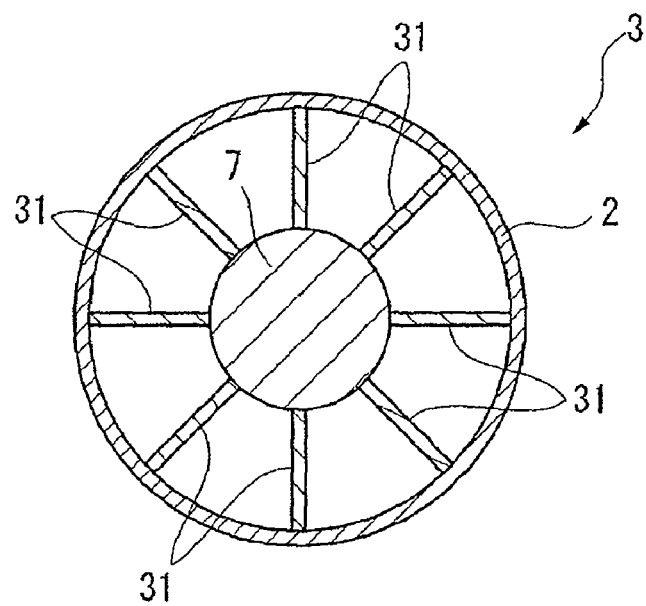
FIG. 2 is a sectional view taken along an A-A line of FIG. 1.

FIGS. 1 and 2 are sectional views schematically showing the schematic configuration of the jet engine 1 of this embodiment. FIG. 1 is a sectional view when the jet engine 1 is cut along an axial direction L, and FIG. 2 is a sectional view (sectional view in a plane orthogonal in the axial direction L) taken along an A-A line of FIG. 1.

As shown in these drawings, the jet engine 1 of this embodiment includes a casing 2, a moving blade row 3 (blade row), a stationary blade row 4 (blade row), a combustion chamber 5, a turbine blade row 6, and a shaft 7.

The casing 2 forms the appearance of the jet engine 1, and has the moving blade row 3, the stationary blade row 4, the combustion chamber 5, the turbine blade row 6, and the shaft 7 stored therein. Opposite ends of the casing 2 in the axial direction L are opened. An opening at one end of the casing is used as an intake port 21 for introducing ambient air into the jet engine 1, and an opening at the other end of the casing is used as a jetting port 22 which jets a combustion gas Z from the jet engine 1. Further, a flow passage 23 which connects the intake port 21 and the jetting port 22 is formed in the axial direction L inside the casing 2.

The moving blade row 3, as shown in FIG. 2, includes a plurality of moving blades 31 (blades) which are arranged around a shaft. Each moving blade 31 is installed in the flow passage 23 formed inside the casing 2 with a negative pressure surface directed toward the intake port 21, and a positive pressure surface directed toward the jetting port 22, and each moving blade 31 is fixed to a shaft 7 installed to extend in the axial direction L.

Figure 3:
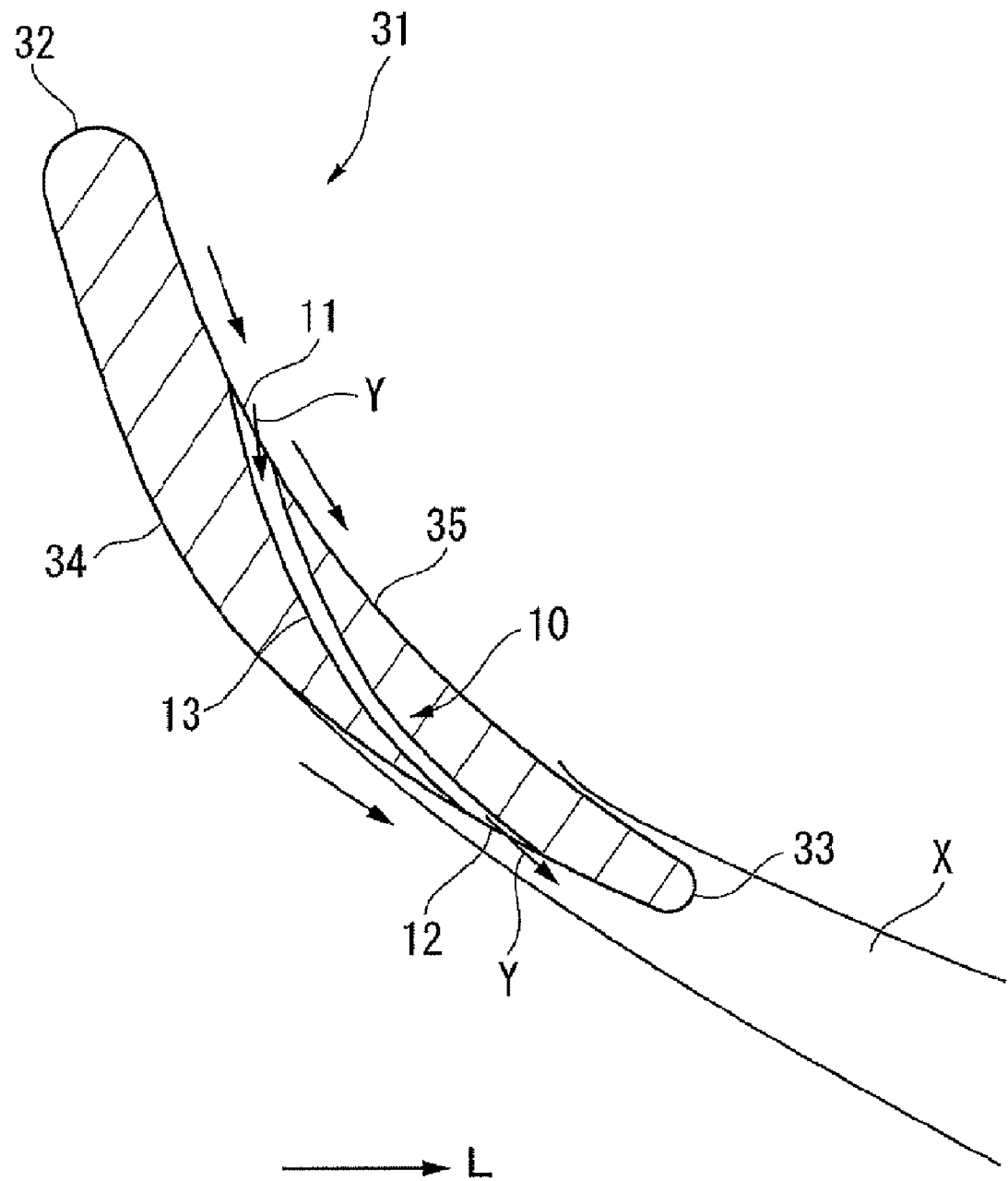
FIG. 3 is a view schematically showing a cross-section of a moving blade provided in the jet engine in the first embodiment of the present invention.

FIG. 3 is a view schematically showing a cross-section of the moving blade 31. As shown in this drawing, the moving blade 31 has a leading edge 32 located at the intake port 21 and a trailing edge 33 located at the jetting port 22, and is thereby installed in a state where a negative pressure surface 34 and a positive pressure surface 35 are inclined with respect to the axial direction L.

Also, as shown in FIG. 3, the moving blade 31 of this embodiment is formed with a fluid passage 10 which jets air Y to wake X (velocity defect region) formed on the downstream of the moving blade 31 in a case where the moving blade 31 is exposed into a fluid. The fluid passage 10 includes an opening 11 (fluid introducing port) formed so as to be exposed to the positive pressure surface 35 of the moving blade 31, an opening 12 (fluid jet port) formed in the negative pressure surface 34 of the moving blade 31, and a passage portion 13 which connects the opening 11 and the opening 12. That is, the fluid passage 10 is formed so as to lead from the positive pressure surface 35 of the moving blade 31 to the negative pressure surface 34 thereof. In the jet engine 1 of this embodiment, a plurality of such fluid passages 10 are formed in each moving blade 31.

Figure 4:
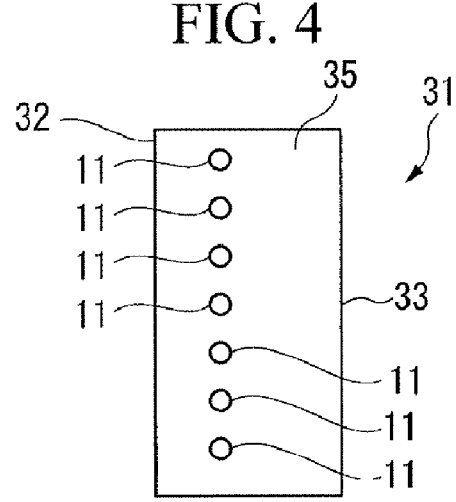
FIG. 4 is a view when the moving blade provided in the jet engine in the first embodiment of the present invention is seen from a positive pressure surface.
Figure 5:
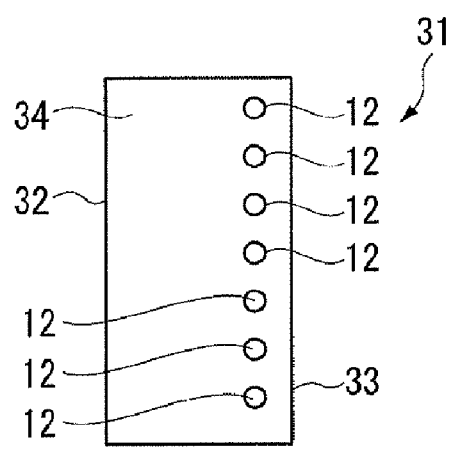
FIG. 5 is a view when the moving blade provided in the jet engine in the first embodiment of the present invention is seen from a negative pressure surface.

The opening 11 of the fluid passage 10, as shown in FIG. 4, is formed near the leading edge 32 of the moving blade 31. Further, the opening 12 of the fluid passage 10, as shown in FIG. 5, is formed near the trailing edge 33 of the moving blade 31. Also, the passage portion 13 is formed inside the moving blade 31 so as to connect the opening 11 and the opening 12 substantially in a straight line.

In addition, the shape of the opening 12 and the passage portion 13 is set such that the air Y to be jet is directed to the wake X.

Further, in the jet engine 1 of this embodiment, as shown in FIG. 4, a plurality of openings 11 are arranged in one row in the width direction of the moving blade 31 in the positive pressure surface 35, and as shown in FIG. 5, a plurality of openings 12 are arranged in one row in the width direction of the moving blade 31 in the negative pressure surface 34.

Returning to FIG. 1, the stationary blade row 4 is installed on the downstream of the moving blade row 3, and is installed apart from the moving blade row 3. The stationary blade row 4 includes a plurality of stationary blades 41 which are arranged around the shaft. Each stationary blade 41 is installed in the flow passage 23 formed inside the casing 2, and is fixed to the casing 2 at an angle such that the stationary blade rectifies the air Y supplied from the moving blade row 3, and the air Y does not flow back from the downstream side.

The combustion chamber 5 is installed on the downstream of the stationary blade row 4. The combustion chamber 5 is formed as apart of the flow passage 23 of the casing 2 is widened. Supply of fuel to the combustion chamber 5 from the outside is allowed, and an ignition device which is not shown is installed in the combustion chamber 5. In such a combustion chamber 5, the air Y which is supplied toward the stationary blade row 4 is combusted after being mixed with fuel. Then, combustion gas Z generated by combustion is exhausted to the flow passage 23 from the combustion chamber 5.

The turbine blade row 6 is installed on the downstream of the combustion chamber 5, and includes a plurality of turbine blades 61 which are arranged around the shaft. Each turbine blade 61 is installed in the flow passage 23 formed inside the casing 2, and is fixed to the shaft 7 at an angle such that it receives combustion gas Z supplied from the combustion chamber 5 side so as to give rotational power in a predetermined direction to the shaft 7.

The shaft 7, as described above, is installed so as to extend in the axial direction L, and has each moving blade 31 and each turbine blade 61 fixed thereto. The shaft 7 is fixed to the casing 2 via a bearing which is not shown.

In the jet engine 1 of this embodiment constructed in this way, first, as the shaft 7 rotates, the moving blades 31 fixed to the shaft 7 rotate around the shaft. Thereby, ambient air (air Y) is introduced into the jet engine 1 from the intake port 21. Thereby, the stream of the air Y along the axial direction L is formed in the flow passage 23 of the casing 2.

The air Y introduced into the jet engine 1 is compressed by way of the moving blades 31 and the stationary blades 41, and is then supplied to the combustion chamber 5. The air Y supplied to the combustion chamber 5 is mixed with fuel and combusted, in the combustion chamber 5. As a result, combustion gas Z is generated. Then, the jet engine 1 obtains thrust as the combustion gas Z is jetted from the jetting port 22.

In addition, the combustion gas Z goes through the turbine blades 61 from the combustion chamber 5 to the jetting port 22. The turbine blades 61 give rotational power in one direction to the shaft 7 as receiving the combustion gas Z. As a result, since the shaft 7 is rotated, it is possible to continue rotating the moving blades 31 fixed to the shaft 7.

In such a jet engine 1, as described above, the stream of the air Y is formed as the moving blades 31 are rotated. That is, the moving blades 31 are relatively exposed into the stream of the air Y. For this reason, as shown in FIG. 3, the wake X which faces the extension direction of the moving blade 31 from the trailing edge 33 is formed on the downstream of the moving blade 31.

Here, in the jet engine 1 of this embodiment, the fluid passage 10 for jetting the air Y to the wake X is formed in a moving blade 31 constituting the upstream blade row (moving blade row 3) of a plurality of blade rows (the moving blade row 3 and the stationary blade row 4). The wake X is a region where a velocity defect is large, i.e., a stream of air is slow in comparison to surrounding regions. For this reason, a velocity defect is alleviated and speed of the jet engine 1 increases as the air Y is jetted from the fluid passage 10 to the wake X, and thereby, the wake X becomes weaker. Although also described in the background art, the noise or vibration which is generated as the wake X interferes with the stationary blades 41 becomes large when the wake is strong, and becomes small when the wake is weak. For this reason, like the jet engine 1 of this embodiment, it is possible to reduce the noise or vibration by weakening the wake X.

Further, in the jet engine 1 of this embodiment, the fluid passage 10 is formed so as to lead from the positive pressure surface 35 of the moving blade 31 to the negative pressure surface 34 thereof. For this reason, the air Y can be introduced into the fluid passage 10 using the differential pressure between the pressure on the side of the positive pressure surface 35 and the pressure on the side of the negative pressure surface 34, and this introduced air Y is jetted to the wake X. Therefore, it is not necessary to introduce the air outside the flow passage 23 into the inside of the apparatus, or to install forced circulating means, such as a pump. That is, in the jet engine 1 of this embodiment, the air Y can be jetted to the wake X by a simple mechanism.

According to the jet engine 1 of this embodiment, it is possible to reliably reduce noise or vibration without complicating the mechanism.

Further, in the jet engine 1 of this embodiment, the opening 11 (opening for introducing the air Y into the passage portion 13) formed so as to be exposed to the positive pressure surface 35 of the moving blade 31 is formed near the leading edge 32, and the opening 12 (opening for jetting the air Y from the passage portion 13) formed so as to be exposed to the negative pressure surface 34 of the moving blade 31 is formed near the trailing edge 33. For this reason, as shown in FIG. 3, the passage portion 13 which connects the opening 11 and the opening 12 can be formed substantially in a straight line toward the wake X. For this reason, it is possible to naturally jet the air Y which is jetted via the fluid passage 10 in the direction in which the passage portion 13 extends, i.e., in the direction facing the wake X.

Figure 6:
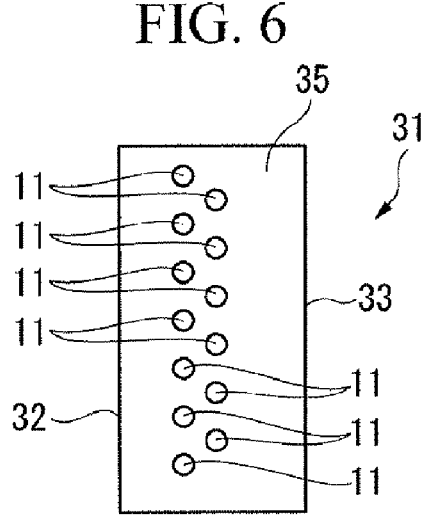
FIG. 6 is a view showing a modified example of the jet engine in the first embodiment of the present invention.
Figure 7:
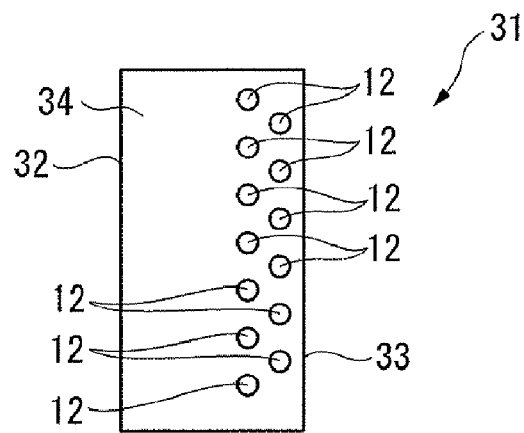
FIG. 7 is a view showing a modified example of the jet engine in the first embodiment of the present invention.

In addition, in the jet engine 1 of this embodiment, as shown in FIG. 4, a plurality of openings 11 are arranged in one row in the width direction of the moving blade 31 in the positive pressure surface 35, and as shown in FIG. 5, a plurality of openings 12 are arranged in one row in the width direction of the moving blade 31 in the negative pressure surface 34. However, the present invention is not limited thereto. For example, as shown in FIGS. 6 and 7, the opening 11 and the opening 12 may be arranged in two rows.

Figure 8:
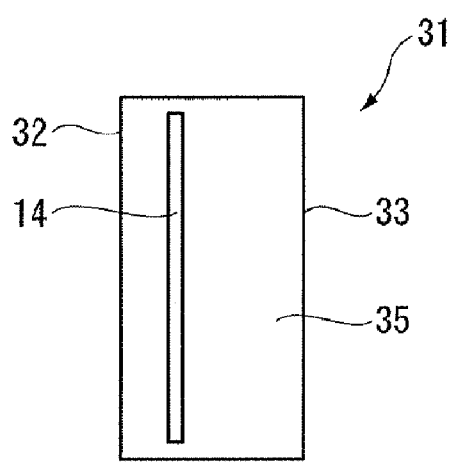
FIG. 8 is a view showing a modified example of the jet engine in the first embodiment of the present invention.
Figure 9:
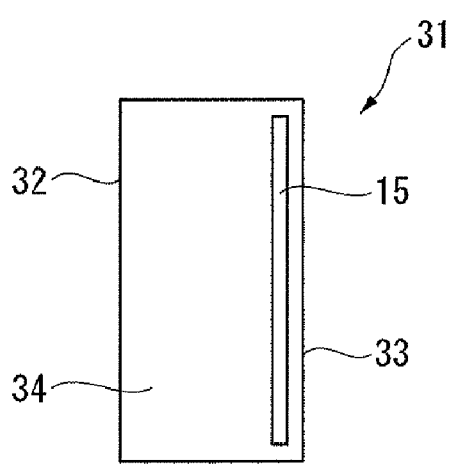
FIG. 9 is a view showing a modified example of the jet engine in the first embodiment of the present invention.

Further, as shown in FIGS. 8 and 9, rectangular openings 14 and 15 which extend in the width direction of the moving blade 31 may be formed, respectively, instead of the plurality of openings 11 and 12. In addition, in this case, one passage portion 13 which connects the opening 14 and the opening 15 is also formed.

Figure 10:
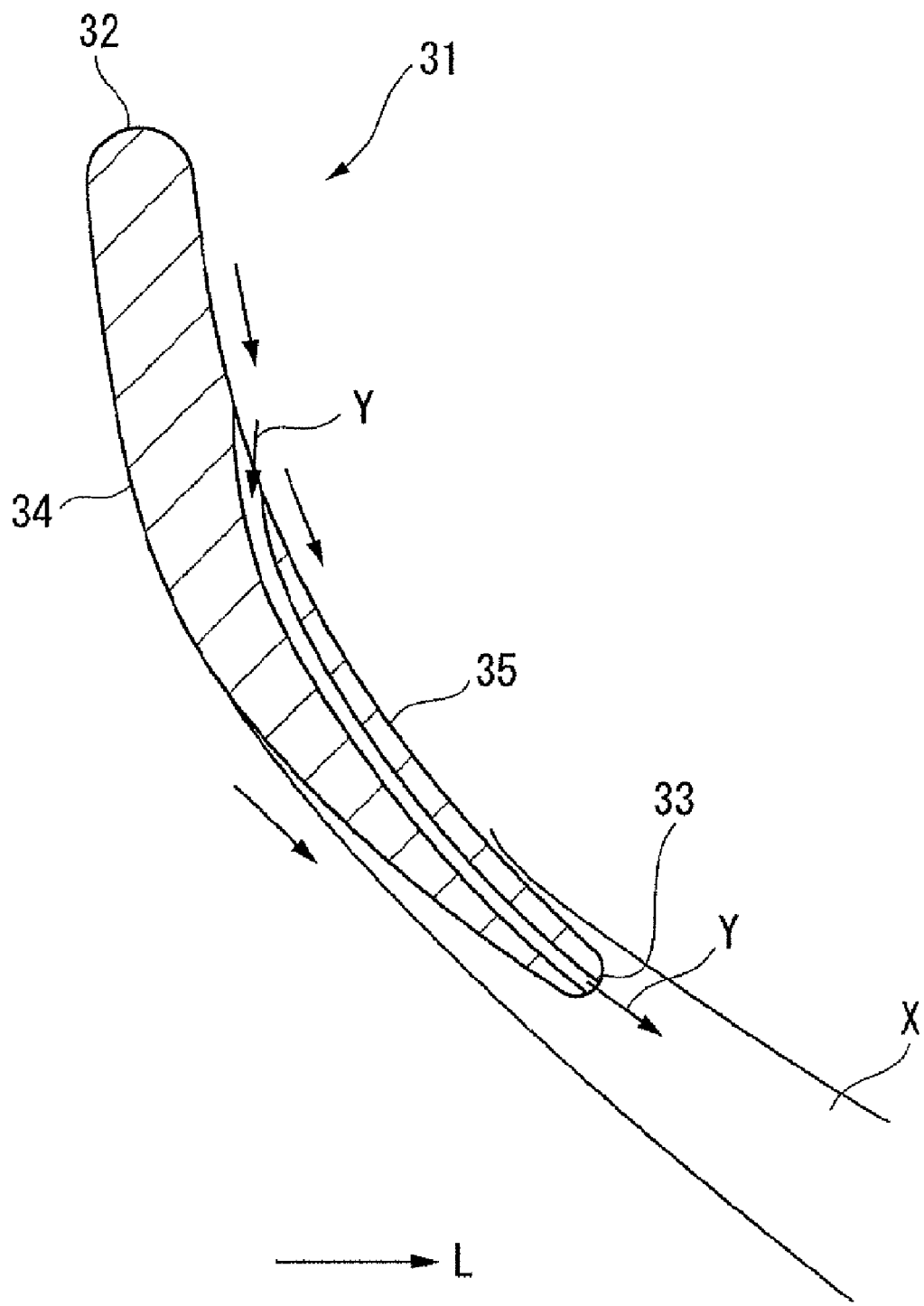
FIG. 10 is a view showing a modified example of the jet engine in the first embodiment of the present invention.

Further, the configuration in which the opening 12 (opening for jetting the air Y from the passage portion 13) is formed so as to be exposed to the negative pressure surface 34 of the moving blade 31 has been described in this embodiment. However, the opening 12 is not necessarily formed so as to be exposed to the negative pressure surface 34 of the moving blade 31, and as shown in FIG. 10, the opening 12 may be formed so as to be exposed to the trailing edge 33 of the moving blade 31. Even in such a case, the air Y can be jetted to the wake X.

Second Embodiment

Next, a second embodiment of the present invention will be described. In addition, in the second embodiment, the same portions as those in the first embodiment are denoted by the same reference numerals, and the description thereof is omitted or simplified.

In the jet engine of this embodiment, a hollow moving blade 81 is fixed to the shaft 7 instead of the moving blade 31 provided in the jet engine 1 of the above embodiment.

Figure 11:
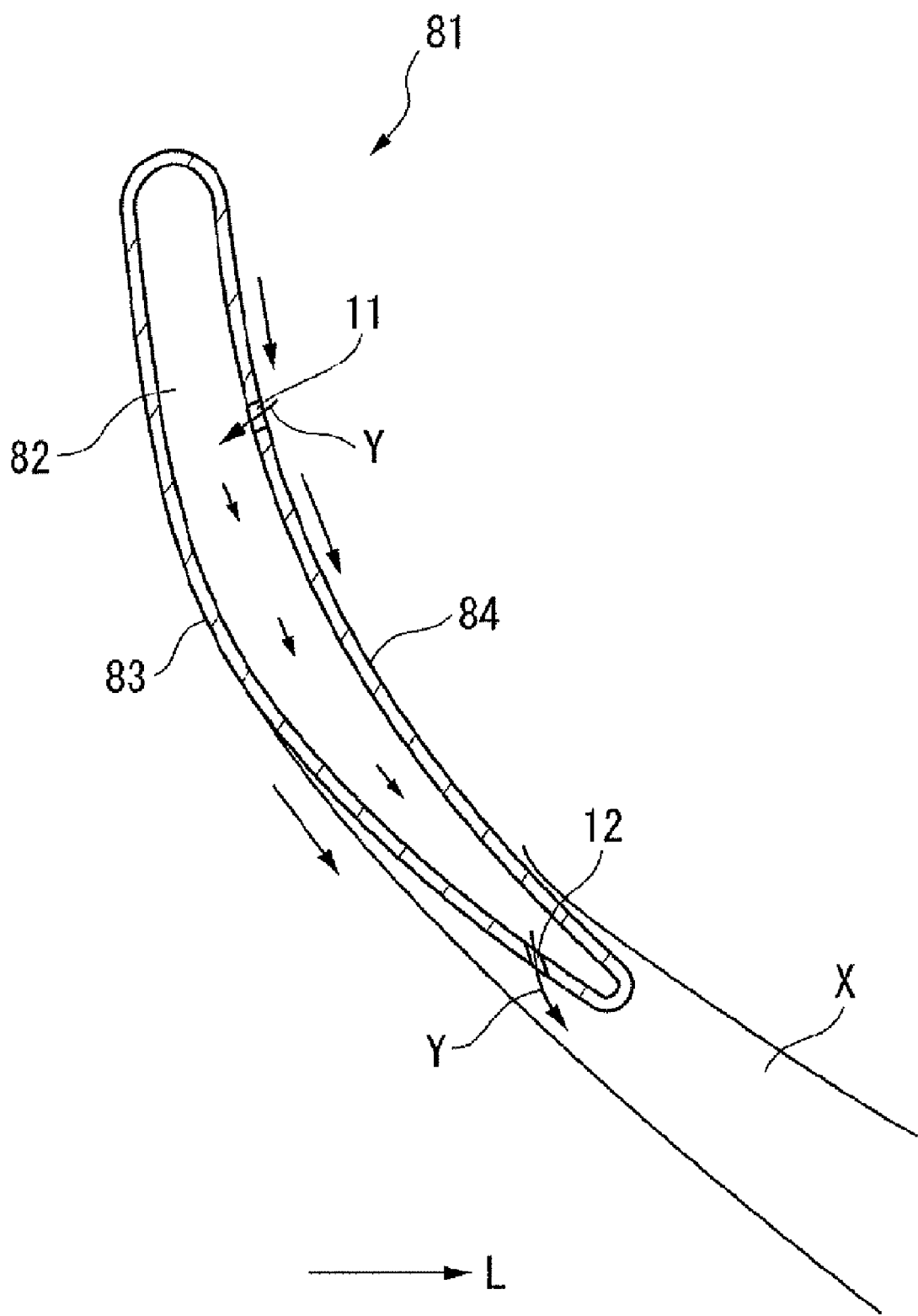
FIG. 11 is a view schematically showing a cross-section of a moving blade provided in a jet engine in a second embodiment of the present invention.

FIG. 11 is a view schematically showing a cross-section of the moving blade 81 provided in the jet engine of this embodiment. As shown in this drawing, the inside 82 of the moving blade 81 is made hollow. The fluid passage 10 includes the opening 11 formed so as to be exposed to a positive pressure surface 84 of the moving blade 81, to the opening 12 formed so as to be exposed to a negative pressure surface 83 of the moving blade 81, and to the inside 82 of the moving blade 81.

By using such a moving blade 81 of which the inside 82 is hollow, it becomes unnecessary to separately form the passage portion 13 shown in the above embodiment, and it is possible to form the fluid passage 10 at low cost.

Although the preferred embodiments of the axial flow fluid apparatus and blades according to the present invention have been described with reference to the accompanying drawings, it should be understood that the present invention is not limited to the above embodiments. Various shapes or combinations of respective constituent members illustrated in the above-described embodiments are merely examples, and various changes may be made depending on design requirements or the like without departing from the spirit or scope of the present invention.

For example, in the above embodiments, the jet engine has been described as an example of the axial flow fluid apparatus of the invention. However, the present invention is not limited to this, and the invention can also be applied to the axial flow fluid apparatus, such as a compressor or a turbine.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An axial flow fluid apparatus comprising:
a plurality of blade rows axially positioned, each row including a plurality of blades arranged around a shaft, each blade of the plurality of blades having a positive pressure surface positioned to face upstream in a direction of fluid flow, a negative pressure surface positioned to face downstream in the direction of fluid flow, a leading edge, and a trailing edge;
at least one blade of the plurality of blades including a fluid passage configured to jet a fluid to a downstream velocity defect region resulting from the at least one blade, the fluid passage including a fluid introducing port positioned so as to be exposed to the upstream side of the at least one blade so as to lead from the positive pressure surface to the negative pressure surface or the trailing edge;
the fluid passage including a fluid jet port positioned in the negative pressure surface or in a trailing edge of the blade, and a passage portion connecting the fluid introducing port and the fluid jet port,
wherein a point of maximum camber of the blade exists between the fluid introducing port and the fluid jet port, and
the fluid introducing port is positioned at less than or equal to 50% of the chord length of the blade measured from the leading edge of the blade.

2. The axial flow fluid apparatus according to claim 1, wherein the fluid jet port is formed relatively closer to the trailing edge of the blade.

3. The axial flow fluid apparatus according to claim 1, wherein the blade is hollow.

4. The axial flow fluid apparatus according to claim 3, wherein the fluid jet port is formed relatively closer to the trailing edge of the blade.

5. A blade exposed into a fluid flow, the blade comprising:
a positive pressure surface positioned to face upstream in a direction of fluid flow, a negative pressure surface positioned to face downstream in the direction of fluid flow, a leading edge, and a trailing edge,
a fluid passage configured to jet a fluid to a downstream velocity defect region resulting from the blade, the fluid passage formed so as to lead from the positive pressure surface to the negative pressure surface;
the fluid passage including a fluid introducing port formed so as to be exposed to the positive pressure surface of the blade, a fluid jet port positioned in the negative pressure surface of the blade, and a passage portion connecting the fluid introducing port and the fluid jet port,
wherein a point of maximum camber of the blade exists between the fluid introducing port and the fluid jet port, and
the fluid introducing port is positioned at less than or equal to 50% of the chord length of the blade measured from a leading edge of the blade.

6. The blade according to claim 5, wherein the fluid jet port is formed relatively closer to the trailing edge of the blade.

7. The blade according to claim 5, wherein the inside of the blade is hollow.

8. The blade according to claim 7, wherein the fluid jet port is formed relatively closer to the trailing edge of the blade.

* * * * *